(12) United States Patent
Thrun et al.

(10) Patent No.: US 10,926,654 B1
(45) Date of Patent: Feb. 23, 2021

(54) ELECTRIC VERTICAL TAKE-OFF AND LANDING VEHICLE WITH WIND TURBINE

(71) Applicant: Kitty Hawk Corporation, Palo Alto, CA (US)

(72) Inventors: Sebastian Thrun, Los Altos Hills, CA (US); Benjamin Otto Berry, Mountain View, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

(21) Appl. No.: 16/836,560

(22) Filed: Mar. 31, 2020

(51) Int. Cl.
| | |
|---|---|
| *B60L 53/24* | (2019.01) |
| *B60L 53/36* | (2019.01) |
| *B64C 29/00* | (2006.01) |
| *B60L 53/52* | (2019.01) |
| *B64F 1/12* | (2006.01) |

(52) U.S. Cl.
CPC ............. *B60L 53/24* (2019.02); *B60L 53/36* (2019.02); *B60L 53/52* (2019.02); *B64C 29/0091* (2013.01); *B64F 1/12* (2013.01)

(58) Field of Classification Search
CPC .......... B60L 53/24; B60L 53/36; B60L 53/52; B64C 29/0091; B64F 1/12
See application file for complete search history.

(56) References Cited

U.S. PATENT DOCUMENTS

| | | | |
|---|---|---|---|
| 10,308,358 B2 | 6/2019 | Phan | |
| 2012/0298790 A1* | 11/2012 | Bitar | B64C 27/10 244/17.11 |
| 2013/0206921 A1* | 8/2013 | Paduano | B64C 13/16 244/7 C |
| 2016/0311544 A1 | 10/2016 | Phan | |
| 2017/0190443 A1 | 7/2017 | Fisher | |
| 2017/0284371 A1* | 10/2017 | Gamble | B64C 27/10 |
| 2017/0300051 A1* | 10/2017 | Zhou | F03D 9/25 |
| 2018/0079482 A1 | 3/2018 | Ivans | |
| 2018/0150072 A1* | 5/2018 | Boss | F03D 7/0224 |
| 2018/0194491 A1 | 7/2018 | Fisher | |
| 2018/0362188 A1 | 12/2018 | Achtelik | |
| 2019/0308724 A1 | 10/2019 | Cooper | |

OTHER PUBLICATIONS

EVTOL Configuration Comparison Feb. 28, 2019.

* cited by examiner

*Primary Examiner* — Rodney A Bonnette
(74) *Attorney, Agent, or Firm* — Van Pelt, Yi & James LLP (57) ABSTRACT

An electric vertical take-off and landing (eVTOL) vehicle is positioned to be in a charging position on the ground, wherein the eVTOL vehicle is capable of performing vertical take-offs and landings. The battery is charged while in the charging position on the ground using a wind turbine that includes the rotor.

21 Claims, 9 Drawing Sheets

ELECTRIC VERTICAL TAKE-OFF AND LANDING VEHICLE WITH WIND TURBINE

BACKGROUND OF THE INVENTION

Impediments to using aircraft as personal transportation in more populated areas are the noise produced and relatively large footprint required by existing aircraft. New types of aircraft that are relatively quiet with a small footprint are being developed to address this. As such aircraft is developed, new ways of management and/or maintenance of such vehicles would be desirable, particularly if such management and/or maintenance is environmentally friendly and/or does not add significantly to the weight of the vehicle.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a technique for charging electric vertical take-off and landing (eVTOL) vehicles using wind energy are described herein. First, it may be helpful to describe some exemplary eVTOL vehicles which are charged in this manner. The following figures describe some example eVTOL vehicles.

Figure 1:
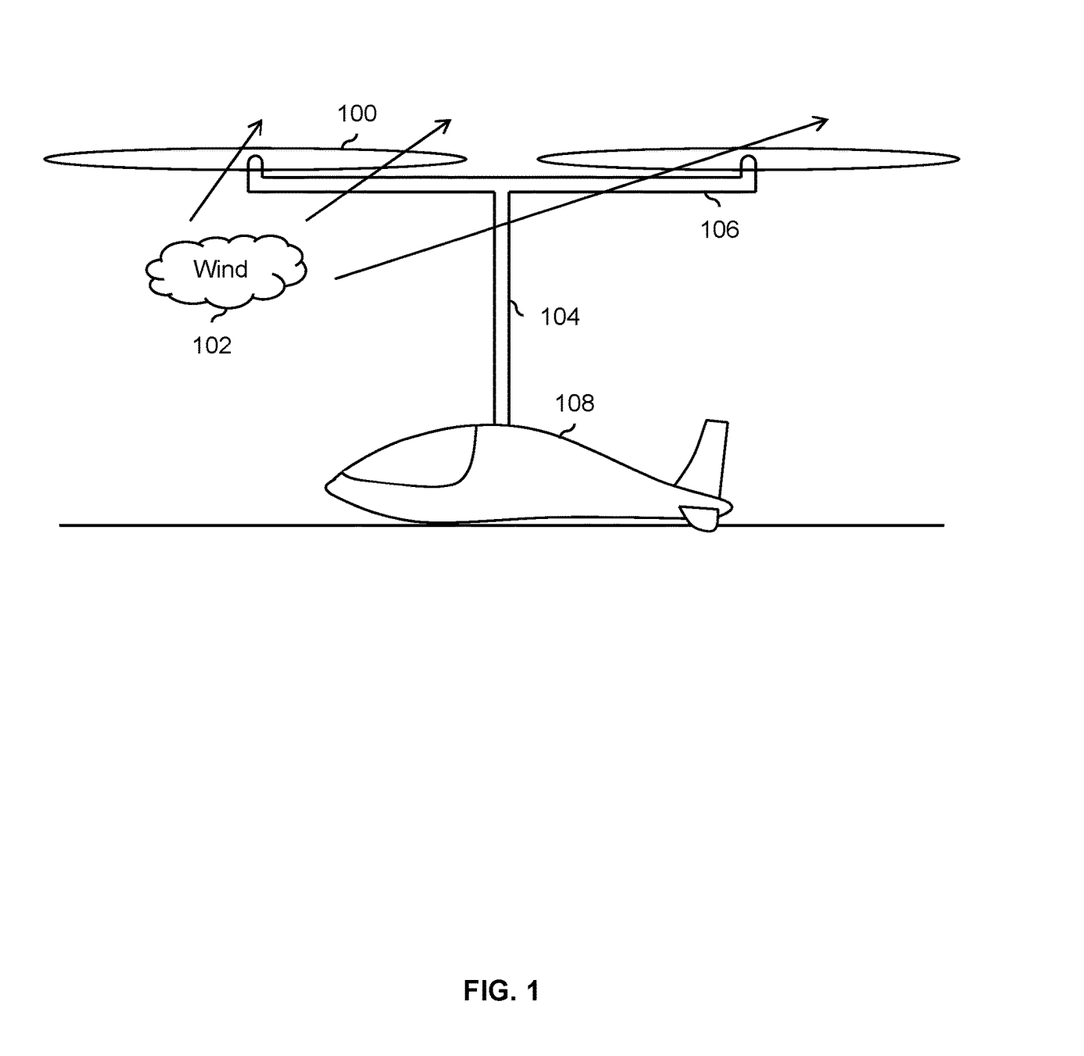
FIG. 1 is a diagram illustrating a first embodiment of a relatively quiet electric vertical take-off and landing (eVTOL) vehicle with relatively long rotor blades.

FIG. 1 is a diagram illustrating a first embodiment of a relatively quiet electric vertical take-off and landing (eVTOL) vehicle with relatively long rotor blades. In this example, the exemplary eVTOL vehicle is a quadcopter with four rotors (100) which rotate about a vertical axis of rotation. To preserve the readability of the drawing, only the front rotor and back rotor are shown in this view. The orientation of the rotors in this quadcopter example permits the vehicle to perform vertical take-offs and landings. This VTOL capability is desirable because it permits the multicopter to land in space-limited locations and/or without a runway (e.g., in a city). To reduce the noise produced by the multicopter, the diameter of the rotors is relatively large (e.g., a diameter of 10 feet or more). This reduces the tip speed of the rotors which in turn reduces the noise produced by the rotors, especially during take-off and landing when the noise is the most noticeable to people on the ground.

In the state shown here, the multicopter is on the ground so that people can get on or get off the vehicle. While on the ground, the wind (102) may blow, causing the large rotors to catch in the wind and act like a sail. To counter this, the rotors stay on while the vehicle is touched down and a controller (e.g., a flight and/or avionics controller) generates one or more control signals (e.g., one for each rotor) to counter any shifts or movement due to the wind blowing on the large rotors. More generally, the shifting that is corrected or otherwise adjusted for may also include noise or errors (e.g., sensor noise, inaccurate models, etc.) in addition to and/or as an alternative to movement due to wind. To put it another way, the controller generates one or more control signals which will cause the rotors to rotate and/or thrust in a manner which causes them to return to a desired, centered, and/or level position (e.g., so that the vehicle is not dragged about as occupants board or disembark).

In this example, a vertical beam (104) is used to elevate the rotors above the heads of any people in the vicinity of the aircraft, including passengers. For example, the vertical beam (104) may be tall enough so that the rotors (100) are above the passenger, and in some embodiments above other common ground obstacles. This may be desirable because it further reduces noise and is safer for people in the vicinity of the vehicle (e.g., the rotors are too high to hit anyone walking by). In some embodiments, the vertical beam (104) is bendable or flexible so that the rotors (100) which are connected to rigid crossbars (106) can move separately from the fuselage (108).

In some embodiments, a vehicle includes one or more pivots, gimbals, or hinges so that one part of the vehicle can be moved or otherwise repositioned relative to another part of the vehicle (e.g., to put the vehicle into a better and/or more efficient charging position so that the vehicle is more stable, so that the rotors are better positioned relative to the direction of the wind, etc.). For example, there may be a hinge where the vertical beam (104) meets the crossbars (106). This may, for example, permit the fuselage (and occupants therein) to move independently of the rotors. This may, for example, provide a more pleasant flight experience for the occupant of the aircraft.

The fuselage shape (108) shown here is merely exemplary and is not intended to be limiting. In some embodiments, the vehicle is a battery powered, autonomously flown vehicle which is used to fly riders from specified pickup locations to specified drop off locations. To improve flight time (and thus, the time between charging), the fuselage may be very different than the example shown here. In some embodiments, the fuselage is an "open air" and/or unenclosed fuselage. For example, there may be a (single) seat for the occupant with safety restraints (e.g., seat belts, a bar which comes down over the occupant's head). Such a "stripped down" fuselage may more closely resemble a ski lift chair or a seat in an amusement park ride rather than a heavier fuselage that completely encloses the occupant. Such an example is described in more detail below. In some other embodiments, the fuselage is enclosed. For example, this may be desirable in applications where the passengers would prefer the comfort and/or protection offered by an enclosed fuselage.

Using such an aircraft to get around congested metropolitan areas is an attractive solution to traffic congestion. In addition to avoiding congested streets, eVTOL aircraft have a relatively small footprint. With an eVTOL aircraft, it is not necessary to have a long runway to perform take-offs and landing. A relatively small area is sufficient to take off and land, which is well suited to congested metropolitan areas. An eVTOL aircraft can (for example) take off and land in parks, parking lots, rooftops, etc. This means that there are many potential take-off and landing spots and the more take-off and landing spots there are, the better coverage there will be for people using the eVTOL aircraft (e.g., their take-off and landing spots near their point of origin and final destination).

One potential obstacle to the deployment of eVTOL aircraft is noise. To address this, eVTOL aircraft need to be quieter than they are now. A major source of noise is the rotors and the amount of noise from the rotors depends primarily upon the tip speed of the rotors. To reduce the tip speed (and thus reduce the amount of noise produced) while still being able to generate sufficient thrust to fly, the example vehicles described herein have relatively long rotor blades (e.g., a diameter of 10 feet or more). This solution of making the rotor blades longer so that tip speed can be reduced is implemented in the exemplary vehicle shown in FIG. 1.

A drawback to using longer rotor blades is that the larger diameter rotors may be more sensitive to wind, essentially acting like a sail. This is especially true when the vehicle is on the ground if the rotors were to stop. Furthermore, in some embodiments, the vehicle is an (ultra)light vehicle which enables the vehicle to fly longer for a given battery capacity, making the example vehicle shown here even more susceptible to wind. To address this, the rotors of the vehicle shown in FIG. 1 keep spinning, even when on the ground to counter the wind and/or (signal) noise as or if needed. A control process continually adjusts the forces and moments (primarily thrust forces) output by the rotors (e.g., so even if the wind shifts the state (e.g., position, rate, etc.) of the rotors relative to a previous state, the rotors return to the previous state (e.g., and the ground position of the passenger compartment is maintained)), as described above.

FIG. 1 is merely one example of an eVTOL vehicle with a small footprint and large rotors (to reduce noise) where the rotors stay on while on the ground and/or while (un)loading occupants. The following figure shows another exemplary vehicle.

Figure 2:
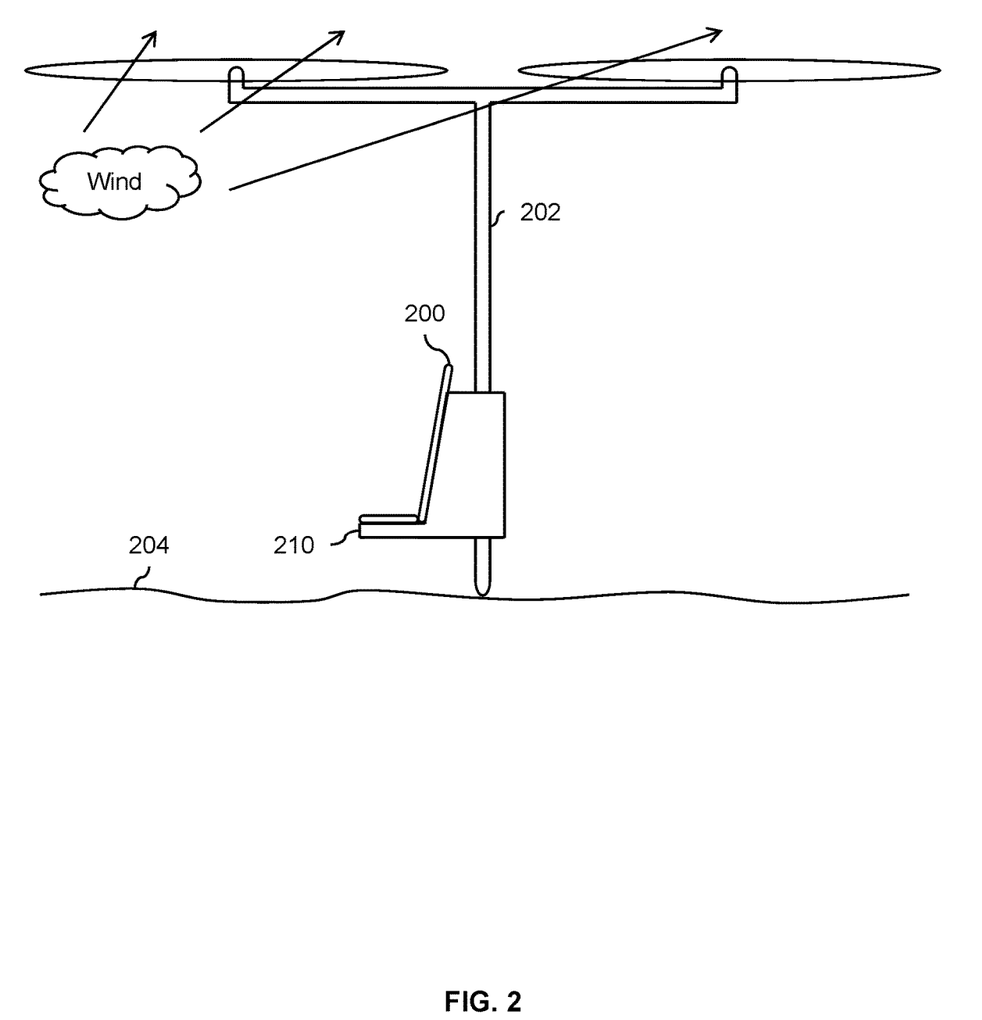
FIG. 2 is a diagram illustrating a second embodiment of a relatively quiet electric vertical take-off and landing (eVTOL) vehicle with relatively long rotor blades with a vertical spar that the vehicle rests upon.

FIG. 2 is a diagram illustrating a second embodiment of a relatively quiet electric vertical take-off and landing (eVTOL) vehicle with relatively long rotor blades with a vertical spar that the vehicle rests upon. In this example, the vehicle is a quadcopter, single seat, and autonomously flown vehicle. As with the previous example, only the front rotor and back rotor are shown in this view to preserve the readability of the drawing. In this example, passengers request a ride and specify a pickup location and drop off location. After the request is granted, a vehicle (e.g., selected from a fleet of vehicles) is sent to pick up the person and take them to the requested destination. To reduce noise (and correspondingly reduce resistance to the service from nearby residents and businesses and/or to comply with local noise ordinances), the blades of the rotors are relatively long.

In this example, to load or unload passengers, the vehicle touches down so that the passenger can get into or out of the vehicle but the only part of the vehicle that touches down is the bottom of the vertical spar (202). Similar to the vehicle shown in FIG. 1, the vertical spar (202), sometimes referred to as a mast, is relatively tall (e.g., so that the rotors are a height of at least 15 or 20 feet) so that the rotors can remain on as passengers board or disembark. Compared to the exemplary vehicle shown in FIG. 1, this vehicle is lighter with an even smaller footprint, making it more attractive in some applications. Another benefit is that since only the bottom of the vertical spar (202) touches the ground (204), this vehicle may be better suited to uneven ground compared the vehicle shown in FIG. 1 where a larger surface makes contact with the ground and/or there are multiple points of contact with the ground.

To make entering and exiting easier for passengers, in this example, the fuselage includes a seat or chair (200) with no sidewalls. The seat may include a restraint (not shown) to hold the passenger in place, such as a seat belt harness or a bar that comes down over the passenger's head. For example, the seat (200) and an associated restraint may resemble a ski lift chair or an amusement park ride. The elimination of an enclosed fuselage or cockpit reduces the weight significantly. A variety of fuselages, seats, and/or safety features may be employed by the vehicle and the example shown here is merely illustrative and is not intended to be limiting.

As described above, to ensure that the vehicle does not move while passengers are boarding or disembarking (e.g., because it is an (ultra)light, because of the relatively long rotor blades, due to noise and/or wind, etc.), the rotors of the vehicle stay on even while the vehicle is on the ground (e.g., to let on or let off passengers).

It is noted that the vehicles shown in FIGS. 1 and 2 are merely exemplary and are not intended to be limiting. For example, although FIGS. 1 and 2 show quadcopter configurations, any number and/or arrangement of rotors may be used. Similarly, any type of cockpit, fuselage, or conveyance for an occupant may be used.

As will be described in more detail below, the large rotor blades of these types of eVTOL vehicles may serve double duty as part of a wind turbine system so that the battery system can be charged. The following figures describe various embodiments of this. Naturally, the features and/or capabilities described in the examples below may be combined in any desired combination.

Figure 3:
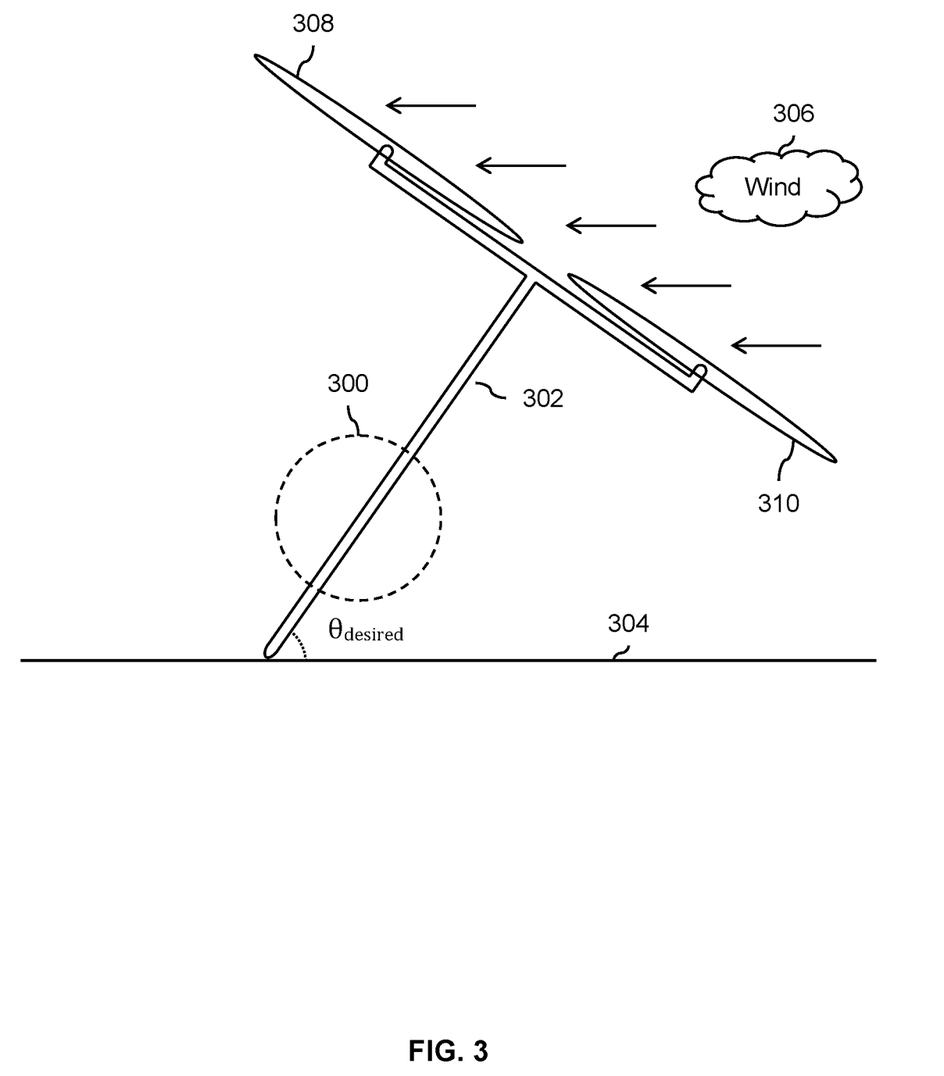
FIG. 3 is a diagram illustrating an embodiment of an eVTOL vehicle acting as a wind turbine.

FIG. 3 is a diagram illustrating an embodiment of an eVTOL vehicle acting as a wind turbine. For convenience and ease of explanation, the exemplary vehicle shown is a quadcopter with the side rotors not shown for clarity. Similarly, a fuselage and/or other passenger seating (e.g., located approximately at 300) is not shown in this example.

In the state shown here, the vehicle is unoccupied and is tilted at angle (θ) so that the vehicle has a non-zero attitude. The bottom of the vertical spar (302) is touching the ground (304) and more specifically is pushed into the ground by the force of the wind (306). The tilting of the vehicle permits the blades (308) of the vehicle to act as a wind turbine, charging the battery system (not shown). Using the relatively long blades of the rotors as a wind turbine is attractive because it is environmental, permits the battery system to be charged even in locations without (e.g., power and/or electrical) infrastructure, and adds minimal weight to the system.

In this example, the vehicle is kept upright in a variety of ways. If the wind is sufficiently strong enough, the force of the wind may be sufficient to keep the vehicle upright by pushing the vehicle into the ground. If needed, the rotors of the vehicle may be used to provide any additional lift to keep the vehicle upright. For example, if the wind dies down and the vehicle begins to tilt even further, a controller may spin up the appropriate rotor(s) so that the vehicle (as an example) returns to some desired angle ($\theta_{desired}$). As described above, when the vehicle is used to transport passengers and the vehicle descends for passengers to disembark or board, the rotors stay on to help the vehicle stay in place (e.g., because the vehicle is not anchored or otherwise tethered when passengers to disembark or board). As such, the vehicle already has built-in processes to keep the vehicle steady and/or in place when the vehicle is in an unstable charging position (e.g., the vehicle's center of mass is not located over the vehicle's area of support). These already implemented processes may be used to keep the vehicle steady when in a charging position. For example, in FIG. 3, if the wind dies down, the front rotor (310) may be spun up so that the vehicle does not fall forward.

In some embodiments, the vehicle's component(s) is/are used to tilt the vehicle into a charging position and/or to provide support for the vehicle while in such a charging position. For example, in FIG. 2, the exemplary vehicle includes an (exposed) chair for a passenger to sit in. In some embodiments, the exemplary vehicle shown in FIG. 2 is tilted forward so that the bottom of the vertical spar (202) and the front edge of the chair's bottom (210) are on the ground to consistently and/or easily tilt the vehicle into a (wind turbine) charging position and/or to better support the vehicle so that the rotors are less relied upon to keep the vehicle from flipping over.

Figure 4:
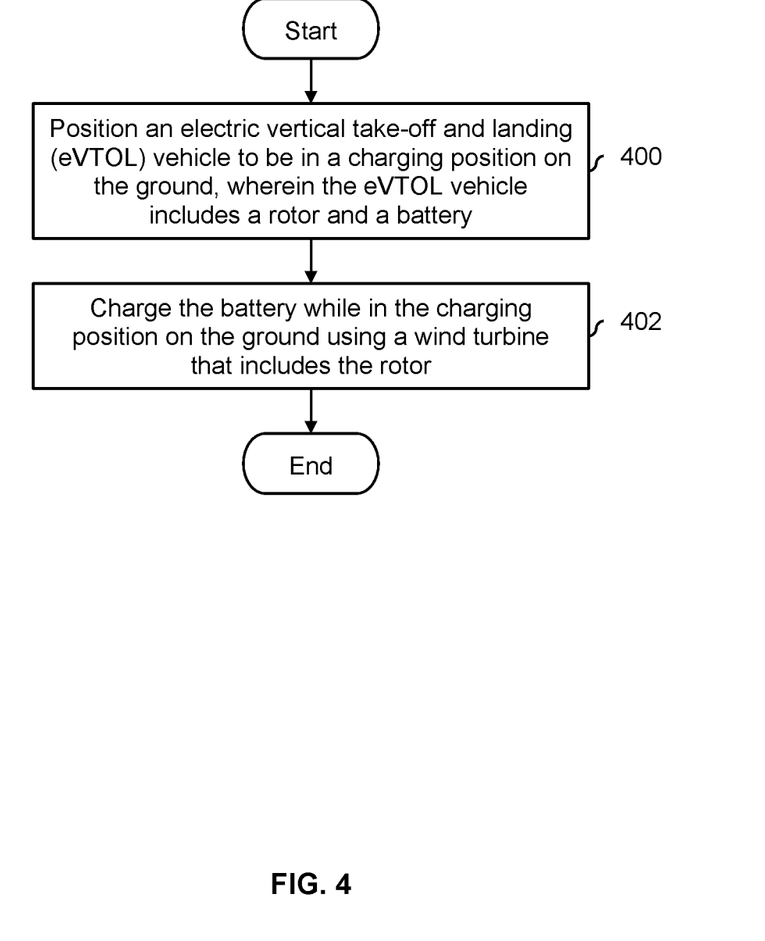
FIG. 4 is a flowchart illustrating an embodiment of a process to charge a battery in an eVTOL vehicle using a wind turbine that includes a rotor from the vehicle.

The following figure describes this example more generally and/or formally in a flowchart.

FIG. 4 is a flowchart illustrating an embodiment of a process to charge a battery in an eVTOL vehicle using a wind turbine that includes a rotor from the vehicle. For example, the vehicles shown in FIGS. 1 and 2 may be autonomous vehicles that (e.g., autonomously) perform the process shown here to recharge their batteries.

At 400, an electric vertical take-off and landing (eVTOL) vehicle is positioned to be in a charging position on the ground, wherein the eVTOL vehicle includes a rotor and a battery. See, for example, FIG. 3, where the vehicle shown there is tilted (e.g., forward) so that the rotors (308), which are part of a wind turbine system, can more efficiently turn the energy from the wind (306) into electrical power. In various embodiments, the vehicle's sensors and/or avionics (e.g., to measure attitude (e.g., comprising a roll angle and a pitch angle) and/or altitude) are used to determine whether (as an example) the vehicle is tilted (e.g., forward) sufficiently.

At 402, the battery is charged while in the charging position on the ground using a wind turbine that includes the rotor. For example, in FIG. 3, in the charging position shown, the wind (306) will turn the rotor blades of the wind turbine to charge the battery.

In some embodiments, the process of FIG. 4 further includes continuously performing an adjustment process, including by detecting whether the eVTOL vehicle has moved out of the charging position. For example, in FIG. 3, the vehicle's gyroscopes or other inertial measurement unit may be used to detect if the vehicle shifts out of the position shown. In response to detecting that the eVTOL vehicle has moved out of the charging position (e.g., due to a change in wind, noise in the system and/or control loop, etc.), the continuously performed adjustment process includes changing an amount of thrust output by the rotor to return the vehicle to the (desired) charging position.

Returning briefly to FIG. 3, the exemplary vehicle shown there is not necessarily modified to more efficiently operate as a wind turbine and/or better or more efficiently hold the vehicle in a charging mode. For example, if the rotors were able to expend less power keeping the vehicle upright and/or in the (wind turbine) charging position, the vehicle would be able to operate in this charging mode more efficiently. The following figures describe various features and/or modifications associated with the vehicle which permit the vehicle to operate more efficiently as a wind turbine. As described above, in some embodiments, an eVTOL vehicle is an (ultra)light vehicle and the examples described below may be especially useful in such applications because they are relatively lightweight.

Figure 5A:
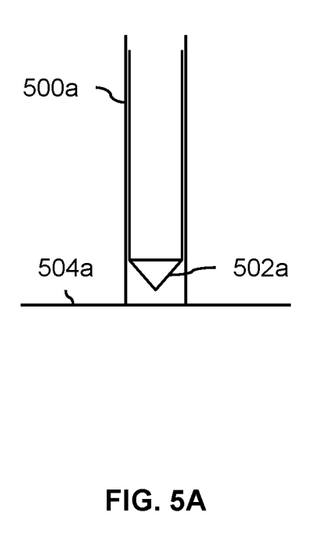
FIG. 5A is a diagram illustrating an embodiment of an anchoring spike prior to extension.

FIG. 5A is a diagram illustrating an embodiment of an anchoring spike prior to extension. In this example, the vertical spar (500a) of a vehicle is shown where the vertical spar includes a pointed and extendable stake, auger, and/or spike (502a). In the state shown here, the bottom of the vertical spar (500a) is touching the ground (504a). For example, the vehicle shown in FIG. 2 may have just touched down on the ground so that the bottom of the vertical spar (202) is in contact with the ground.

Figure 5B:
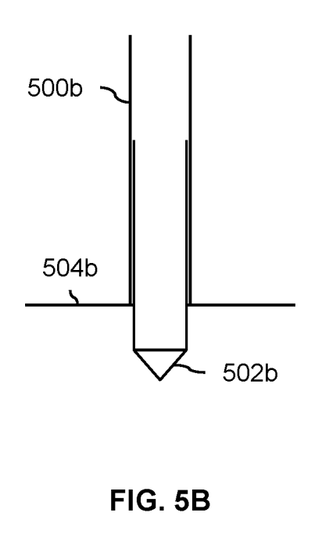
FIG. 5B is a diagram illustrating an embodiment of an anchoring spike after extension.

FIG. 5B is a diagram illustrating an embodiment of an anchoring spike after extension. In the state shown here, the pointed spike (502b) has been extended so that it pierces the ground (504b) and protrudes from the vertical spar (500b). By anchoring the vehicle to the ground as shown here, this reduces the amount of power expended by the rotors to keep the vehicle upright and/or in a charging position.

When the vehicle is done charging, the anchoring spike (502b) may be retracted (not shown). In anticipation of this or as the anchoring spike is retracted, the rotors of the vehicle may be spun up in order to compensate for any loss of stability and/or support due to the retraction of the anchor.

Figure 5C:
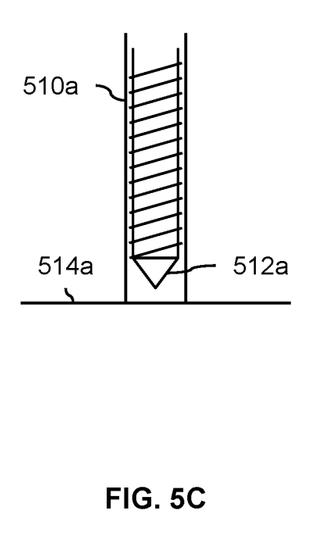
FIG. 5C is a diagram illustrating an embodiment of an anchoring screw before extension.

FIG. 5C is a diagram illustrating an embodiment of an anchoring screw before extension. FIG. 5C is similar to the example of FIG. 5A except the anchor is a screw as opposed to a spike. As before, the vertical spar (510a) is touching the ground (514a) with the anchoring screw (512a) retracted inside of the vertical spar (510a).

Figure 5D:
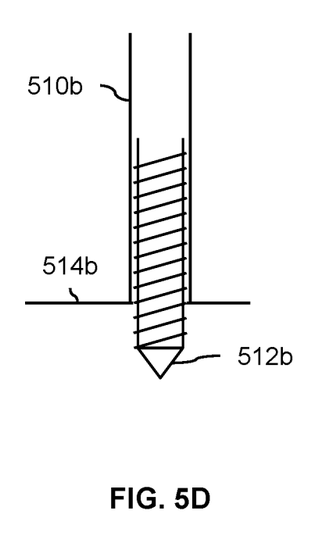
FIG. 5D is a diagram illustrating an embodiment of an anchoring screw before extension.

FIG. 5D is a diagram illustrating an embodiment of an anchoring screw before extension. In the state shown here, the anchoring screw (512b) has been twisted into the ground (514b) so that it extends out from the vertical spar (510b).

A benefit to having an anchor housed in the vertical spar is that the pointed tips of the anchors are shielded when the anchors are retracted into the vertical spar. For example, this may prevent injury to passengers of the vehicle and/or technicians or other service people that maintain the vehicle.

For simplicity and ease of explanation, the examples shown here are shown with the vertical spar and anchor perpendicular to the surface of the ground. Naturally, the vehicle (or, more specifically, a vertical spar or other component which houses an anchor) may be at an angle relative to the ground before any anchor is extended into the ground.

Returning briefly to FIG. 4, as shown in these examples, in some embodiments, positioning the eVTOL vehicle to be in the charging position on the ground at step 400 includes extending (e.g., in some cases, including by screwing) an anchor (e.g., a screw, a spike, etc.) into the ground. In some such embodiments, the eVTOL vehicle further includes a vertical spar, wherein the anchor retracts into the vertical spar.

Returning briefly to FIG. 3, in that example, the positions of the various components of the eVTOL vehicle are fixed relative to each other. In some embodiments, the vehicle includes a hinge or other device so that certain parts of the eVTOL vehicle can be moved into positions that are better and/or more efficient for (wind turbine) charging purposes when the vehicle is in the charging position. The following figures illustrate some examples of this.

Figure 6A:
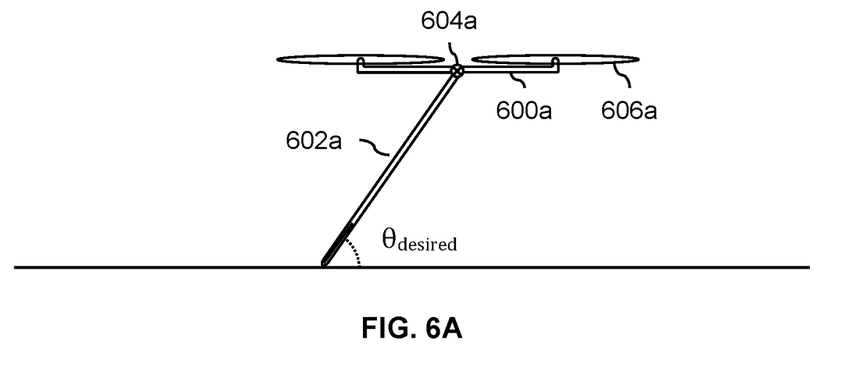
FIG. 6A is a diagram illustrating an embodiment of an eVTOL vehicle with a hinge at the intersection of a vertical spar and a horizontal spar.

FIG. 6A is a diagram illustrating an embodiment of an eVTOL vehicle with a hinge at the intersection of a vertical spar and a horizontal spar. As with previous examples, only two rotors in the exemplary quadcopter are shown and the fuselage or other passenger seating is not shown (e.g., for readability, simplicity, etc.). In this example, the horizontal spar (600a) and vertical spar (602a) of the vehicle are connected by a hinge (604a) which permits the horizontal spar (600a) and the attached rotors (606a) to rotate relative to the vertical spar (602a). In some embodiments, the hinge (604a) is lockable and the lock is released in anticipation of putting the vehicle into the charging position (see, e.g., FIG. 6C). For example, the lock may be released as the eVTOL vehicle is descending but before the vehicle touches the ground.

Once the hinge's lock is released (if needed), the vehicle slowly descends until the bottom of the vertical spar (602a) touches the ground. The rotors (606a) and horizontal spar (600a) continue to descend, and the (unlocked) hinge (604a) permits the vertical spar (602a) to tilt at a steeper and steeper angle (e.g., until some desired angle ($\theta_{desired}$) is reached) as the rotors (606a) and horizontal spar (600a) continue to descend while the rotors and horizontal spar remain in a horizontal position.

Figure 6B:
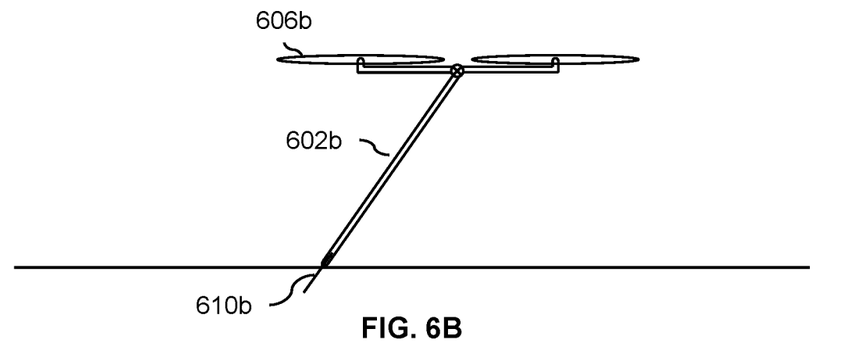
FIG. 6B is a diagram illustrating an embodiment of an eVTOL vehicle with an anchor and a hinge after the anchor is extended.

FIG. 6B is a diagram illustrating an embodiment of an eVTOL vehicle with an anchor and a hinge after the anchor is extended. Once the vertical spar (602b) is at the desired angle ($\theta_{desired}$) relative to the ground, the anchor (610b) is extended from the vertical spar (602b) into the ground. The rotors (606b) continue to rotate throughout this process as or if needed, for example to keep the vehicle from tipping over or falling.

Figure 6C:
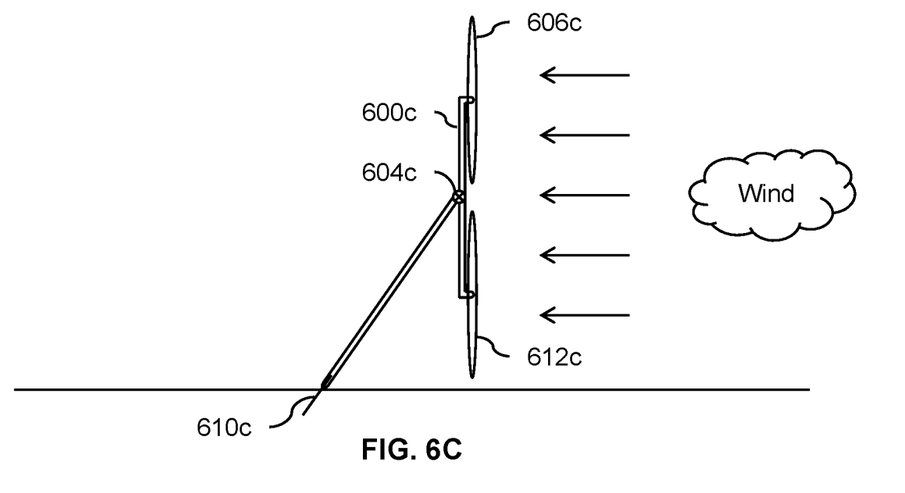
FIG. 6C is a diagram illustrating an embodiment of an eVTOL vehicle with an anchor and a hinge after the anchor is extended and the rotors are rotated.

FIG. 6C is a diagram illustrating an embodiment of an eVTOL vehicle with an anchor and a hinge after the anchor is extended and the rotors are rotated. Once the anchor (610c) is extended, the rotors (606c and 612c) and horizontal spar (600c) are rotated about the hinge (604c) to be in the charging position shown here which is more efficient for charging (e.g., because the plane formed by the rotors is perpendicular to the direction of the wind). For example, to get into this position, the thrust output by the back rotor (606c) is increased and the thrust output by the front rotor (612c) is decreased so that the rotors and horizontal spar rotate about the hinge (604c). It is noted that the wind turbine in the position shown here is able to operate more efficiently compared to the charging position shown in FIG. 3 where the plane formed by the rotors is not perpendicular to the wind. As shown here, the hinge (604c) permits the eVTOL vehicle to be put into or otherwise configured in a better and/or more efficient charging position. Similarly, the anchor (610c) permits the eVTOL vehicle to expend less power keeping the vehicle upright and/or from falling over.

The following figures show another embodiment where the hinge(s) is/are in a different location.

Figure 7A:
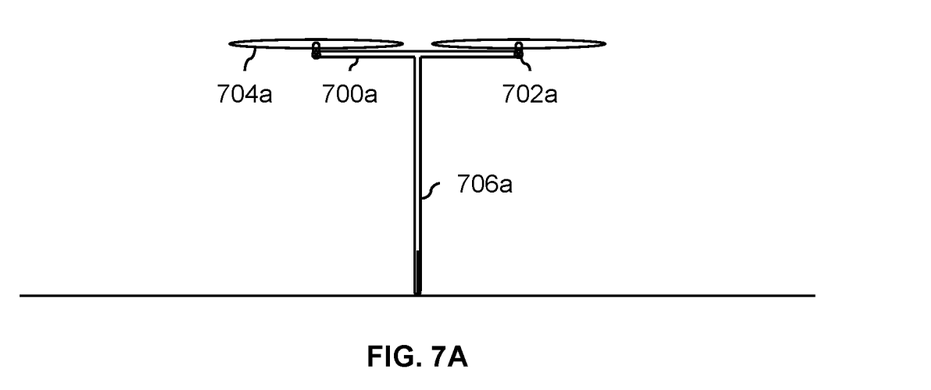
FIG. 7A is a diagram illustrating an embodiment of an eVTOL vehicle with hinges at the ends of a horizontal spar.

FIG. 7A is a diagram illustrating an embodiment of an eVTOL vehicle with hinges at the ends of a horizontal spar. In this example, the horizontal spar (700a) has two hinges (702a) at the ends of the spar beneath the center of the rotors (704a). In the state shown here, the vehicle has descended so that the bottom of the vertical spar (706a) is touching the ground. As with previous examples, a simplified diagram is shown with limited components and/or parts that are relevant to the discussion.

Figure 7B:
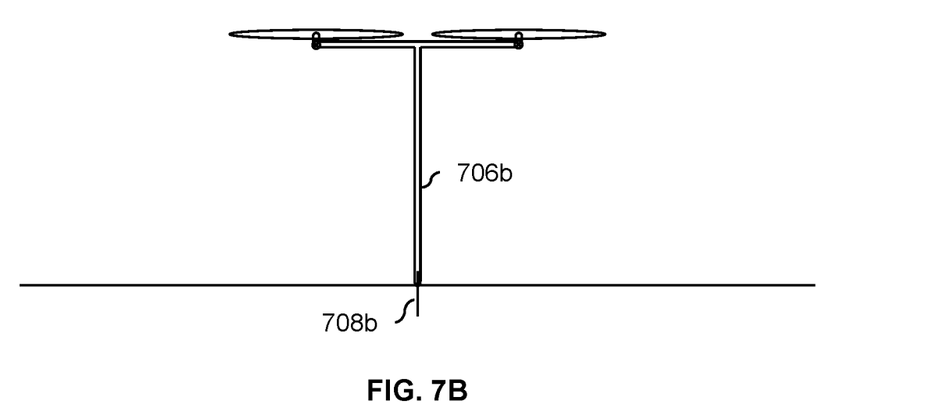
FIG. 7B is a diagram illustrating an embodiment of an eVTOL vehicle with hinges at the ends of a horizontal spar and with an extended anchor.

FIG. 7B is a diagram illustrating an embodiment of an eVTOL vehicle with hinges at the ends of a horizontal spar and with an extended anchor. After the vehicle has touched down, the anchor (708b) is extended into the ground. It is noted that the vertical spar (706b) is perpendicular to the ground in this example when the anchor is extended whereas in some previous examples the vertical spar was not at a right angle relative to the ground. Keeping the vertical spar in a vertical position during charging may be (more) desirable because the vehicle's center of mass is over the anchor so that the vehicle is in a more stable position during charging and/or the rotors do not have to expend power to keep the vehicle upright and/or from falling over.

Figure 7C:
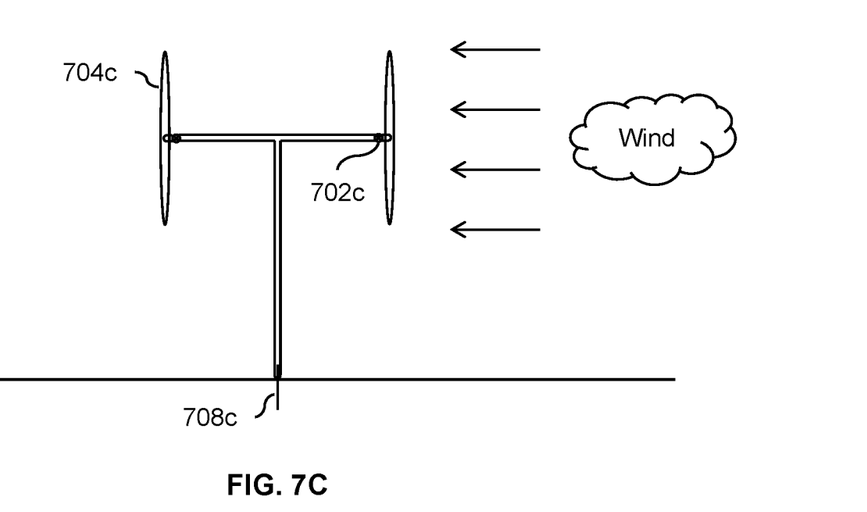
FIG. 7C is a diagram illustrating an embodiment of an eVTOL vehicle with hinges at the ends of a horizontal spar and the rotors tilted.

FIG. 7C is a diagram illustrating an embodiment of an eVTOL vehicle with hinges at the ends of a horizontal spar and the rotors tilted. With the anchor (708*c*) extended, the hinges (702*c*) are unlocked. Then, to rotate the rotors (704*c*) into the position shown here, an actuator would be used to rotate it from the position shown in FIG. 7B (e.g., where the rotors rotate about a vertical axis of rotation) to the position shown in FIG. 7C (e.g., where the rotors rotate about a horizontal axis of rotation). In some embodiments, the rotors have a swashplate for cyclic control and the rotors are able to rotate themselves (e.g., between the positions shown in FIG. 7B and FIG. 7C) with a hinge. In such embodiments, the hinge includes some kind of brake, switch, or actuator to lock and unlock the part.

Returning briefly to FIG. 4, as shown in the above examples, in some embodiments, positioning the eVTOL vehicle to be in the charging position on the ground includes rotating the rotor about a hinge. In some embodiments, this step also includes unlocking the hinge prior to rotating the rotor about the hinge.

Figure 8A:
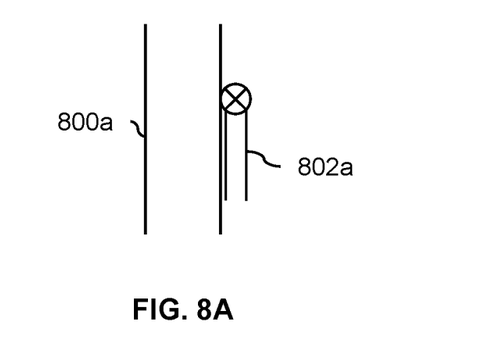
FIG. 8A is a diagram illustrating an embodiment of an eVTOL vehicle with a folded strut.

FIG. 8A is a diagram illustrating an embodiment of an eVTOL vehicle with a folded strut. In this example, the vertical spar (800*a*) has one or more struts or legs (802*a*) that are folded down against the vertical spar when the legs are not in use. For example, in various embodiments, the strut is electromagnetically or mechanically latched, locked, or otherwise held against the vertical spar when the vehicle is in a transport mode (e.g., carrying passengers) and not in a charging mode or position. As will be described in more detail, the one or more struts may be used to support the vehicle while the vehicle is in a charging mode.

Figure 8B:
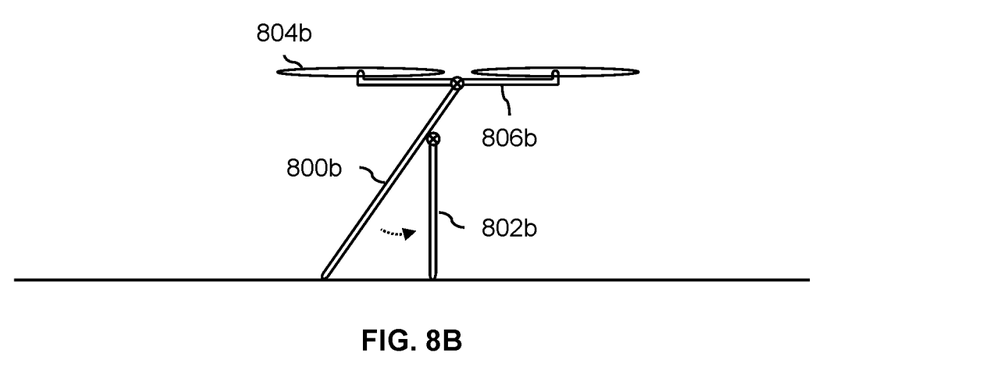
FIG. 8B is a diagram illustrating an embodiment of an eVTOL vehicle supported by one or more struts.

FIG. 8B is a diagram illustrating an embodiment of an eVTOL vehicle supported by one or more struts. In this example, the vehicle is partially through the transition into the charging state. The one or more struts (802*b*) have been swung out (e.g., passively using gravity or actively using an actuator) away from the vertical spar (800*b*) with the bottom of the vertical spar (800*b*) and the bottom of the strut (802*b*) touching the ground. The horizontal spar (806*b*) and the plane formed by the rotors (804*b*) are still horizontal. In this example, the vertical spar (800*b*) is not perpendicular to the ground.

Figure 8C:
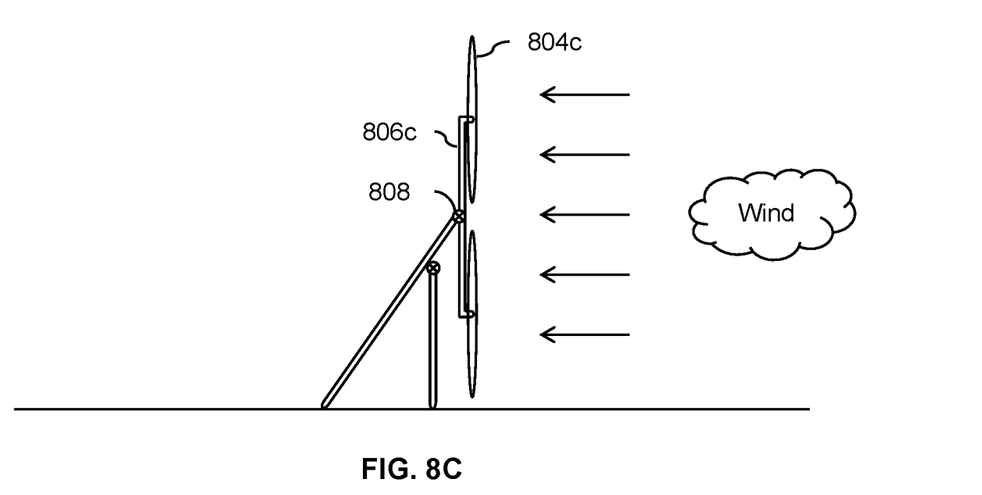
FIG. 8C is a diagram illustrating an embodiment of an eVTOL vehicle supported by one or more struts with its rotors tilted.

FIG. 8C is a diagram illustrating an embodiment of an eVTOL vehicle supported by one or more struts with its rotors tilted. In this example, the rotors (804*c*) and horizontal spar (806*c*) have rotated about the hinge (808) to better position the rotors relative to the direction of the wind.

Returning briefly to FIG. 4, in some embodiments, positioning the eVTOL vehicle to be in the charging position on the ground includes causing a strut to hinge away from a vertical spar (e.g., passively or actively), wherein an end of the vertical spar and an end of the strut are in contact with the ground when the eVTOL vehicle is in the charging position on the ground.

Figure 9:
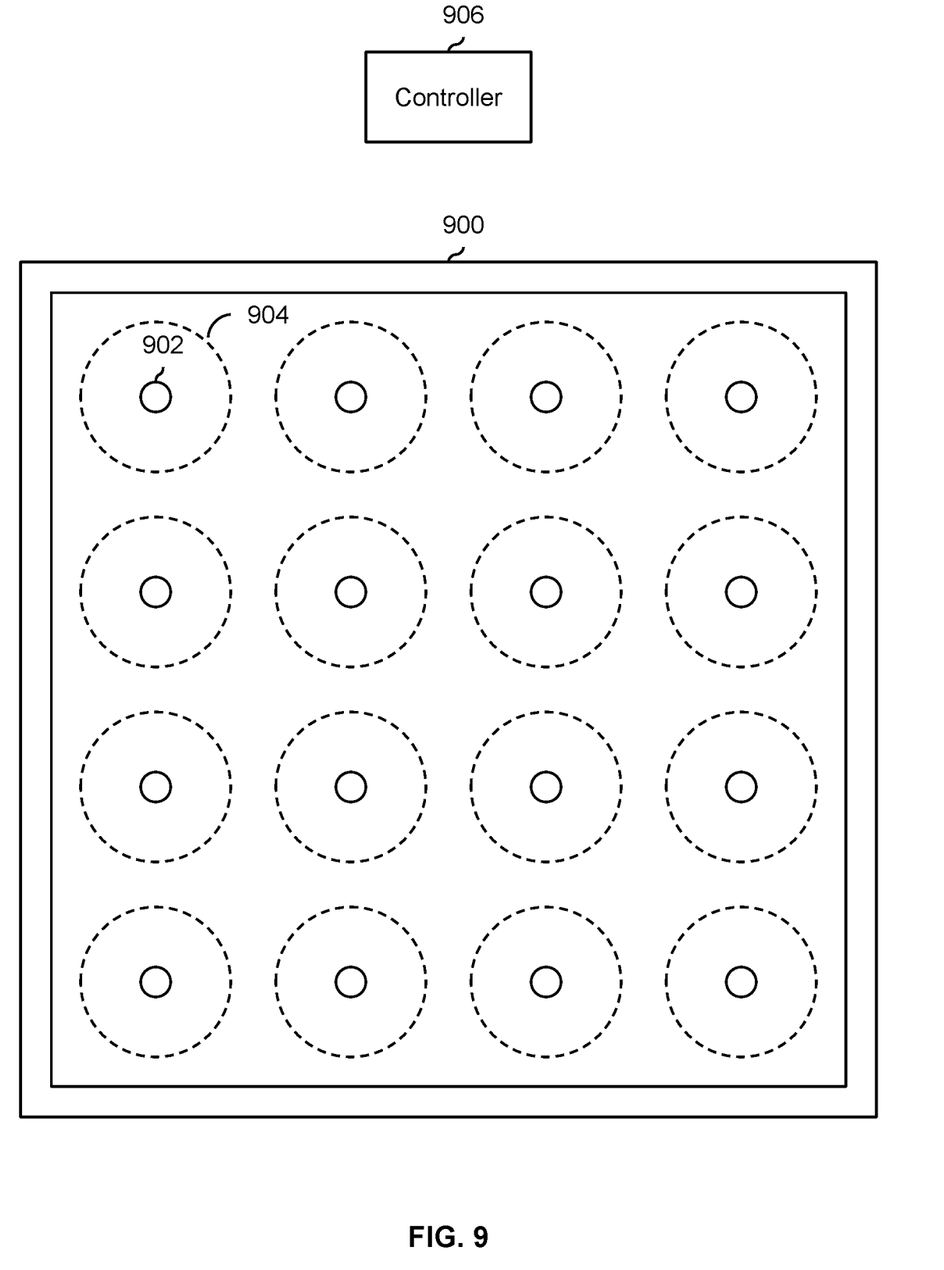
FIG. 9 is a diagram illustrating an embodiment of a fenced off area for eVTOL vehicles to charge in which is managed by a controller.

If desired, the charging techniques described above may be used to charge the exemplary eVTOL vehicles in locations with little or no infrastructure using wind energy. For example, if desired, the built-in wind turbines in the exemplary eVTOL vehicles permit the vehicles to be flown to remote locations that are off the grid but can still be charged. Alternatively, a vehicle may be charged in a designed charging location and/or a location with more infrastructure. The following figure describes one such example where there is a fenced-off area where eVTOL vehicles can go to charge (e.g., in a wind turbine charging mode). As will be described in more detail below, multiple vehicles may simultaneously use the area and the area is autonomously controlled by some controller.

FIG. 9 is a diagram illustrating an embodiment of a fenced off area for eVTOL vehicles to charge in which is managed by a controller. In this example, an area that is surrounded by a fence (900) is used by eVTOL vehicles to fly into and charge using wind energy. In this example, there are spots or spaces for 16 vehicles. For example, the fence may keep out animals and/or people and prevent injuries when the vehicles are in their wind turbine charging mode or configuration. Each space includes a cradle or base (902) for a vertical spar or mast of the vehicle to fit into. The footprint of each vehicle is shown with a dashed line (904) with sufficient room between the spaces so that adjacent or neighboring vehicles do not collide as they land, (re)position or (re)configure themselves into a charging position, etc. In some embodiments, the cradle is relatively simple, such as a hole in the ground, which permits the vehicle to be in a more stable position when acting as a wind turbine and charging its battery. In some embodiments, the cradle or base includes some locking mechanism (e.g., that is triggered and released by the up and/or down movement of the vertical spar).

In this example, to help avoid collisions during takeoff and landing, the fenced off area is managed by an autonomous controller (906). For example, the controller keeps track of which spaces are occupied by a vehicle, if any. As described above, the exemplary eVTOL vehicles are unoccupied and are in an autonomous flight mode prior to charging. As a vehicle approaches the fenced off area, a controller in the vehicle contacts or otherwise communicates with the (secured area) controller to request a space in the secured area. The controller then assigns the vehicle to an unoccupied space (e.g., following some sequence of assigned spots or spaces that keeps vehicles at maximal distances from each other) and the vehicle (autonomously) lands in the assigned spot. At the end of charging, the vehicle may communicate with the controller to indicate the vehicle's departure so that the controller knows the space is now unoccupied. In some embodiments, the controller also acts like a flight controller (e.g., only permitting one vehicle to be in air at a given time).

As shown here, in some embodiments of FIG. 4, an eVTOL vehicle is positioned to be in a charging position on the ground in a secured (e.g., fenced off) area and the process of FIG. 4 further includes communicating with a controller to receive an assigned location in the secured area for the eVTOL vehicle to be positioned in the charging position on the ground.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An electric vertical take-off and landing (eVTOL) vehicle, comprising:
   a battery, wherein the eVTOL vehicle is an electric vehicle;
   a controller configured to position the eVTOL vehicle to be in a charging position on a ground, wherein:
      the eVTOL vehicle is capable of performing vertical take-offs and landings;
      positioning the eVTOL vehicle to be in the charging position on the ground includes extending an anchor into the ground; and the eVTOL vehicle further includes a vertical spar, wherein the anchor retracts into the vertical spar; and
a wind turbine that includes a rotor, wherein the battery is charged using the wind turbine while the eVTOL vehicle is in the charging position on the ground.

2. The eVTOL vehicle recited in claim 1, wherein positioning the eVTOL vehicle to be in the charging position on the ground includes rotating the rotor about a hinge.

3. The eVTOL vehicle recited in claim 1, wherein positioning the eVTOL vehicle to be in the charging position on the ground includes rotating the rotor about a hinge and unlocking the hinge prior to rotating the rotor about the hinge.

4. The eVTOL vehicle recited in claim 1, wherein:
the eVTOL vehicle is positioned to be in the charging position on the ground in a secured area; and
the controller is further configured to communicate with a secured area controller to receive an assigned location in the secured area for the eVTOL vehicle to be positioned in the charging position on the ground.

5. An electric vertical take-off and landing (eVTOL) vehicle, comprising:
a battery, wherein the eVTOL vehicle is an electric vehicle;
a controller configured to position the eVTOL vehicle to be in a charging position on a ground, wherein:
the eVTOL vehicle is capable of performing vertical take-offs and landings; and
positioning the eVTOL vehicle to be in the charging position on the ground includes causing a strut to hinge away from a vertical spar, wherein an end of the vertical spar and an end of the strut are in contact with the ground when the eVTOL vehicle is in the charging position on the ground; and
a wind turbine that includes a rotor, wherein the battery is charged using the wind turbine while the eVTOL vehicle is in the charging position on the ground.

6. The eVTOL vehicle recited in claim 5, wherein positioning the eVTOL vehicle to be in the charging position on the ground further includes extending an anchor into the ground.

7. The eVTOL vehicle recited in claim 5, wherein:
positioning the eVTOL vehicle to be in the charging position on the ground further includes extending an anchor into the ground; and
the anchor retracts into the vertical spar.

8. The eVTOL vehicle recited in claim 5, wherein:
the eVTOL vehicle is positioned to be in the charging position on the ground in a secured area; and
the controller is further configured to communicate with a secured area controller to receive an assigned location in the secured area for the eVTOL vehicle to be positioned in the charging position on the ground.

9. A method, comprising:
positioning an electric vertical take-off and landing (eVTOL) vehicle to be in a charging position on a ground, wherein:
the eVTOL vehicle is capable of performing vertical take-offs and landings;
positioning the eVTOL vehicle to be in the charging position on the ground includes extending an anchor into the ground; and
the eVTOL vehicle further includes a vertical spar, wherein the anchor retracts into the vertical spar; and
charging a battery while in the charging position on the ground using a wind turbine that includes a rotor.

10. The method recited in claim 9, wherein positioning the eVTOL vehicle to be in the charging position on the ground includes rotating the rotor about a hinge.

11. The method recited in claim 9, wherein positioning the eVTOL vehicle to be in the charging position on the ground includes rotating the rotor about a hinge and unlocking the hinge prior to rotating the rotor about the hinge.

12. The method recited in claim 9, wherein:
the eVTOL vehicle is positioned to be in the charging position on the ground in a secured area; and
the method further includes communicating with a secured area controller to receive an assigned location in the secured area for the eVTOL vehicle to be positioned in the charging position on the ground.

13. A method, comprising:
positioning an electric vertical take-off and landing (eVTOL) vehicle to be in a charging position on a ground, wherein:
the eVTOL vehicle is capable of performing vertical take-offs and landings; and
positioning the eVTOL vehicle to be in the charging position on the ground includes causing a strut to hinge away from a vertical spar, wherein an end of the vertical spar and an end of the strut are in contact with the ground when the eVTOL vehicle is in the charging position on the ground; and
charging a battery while in the charging position on the ground using a wind turbine that includes a rotor.

14. The method recited in claim 13, wherein positioning the eVTOL vehicle to be in the charging position on the ground further includes extending an anchor into the ground.

15. The method recited in claim 13, wherein:
positioning the eVTOL vehicle to be in the charging position on the ground further includes extending an anchor into the ground; and
the anchor retracts into the vertical spar.

16. The method recited in claim 13, wherein:
the eVTOL vehicle is positioned to be in the charging position on the ground in a secured area; and
the method further includes communicating with a secured area controller to receive an assigned location in the secured area for the eVTOL vehicle to be positioned in the charging position on the ground.

17. A computer program product, the computer program product being embodied in a non-transitory computer readable storage medium and comprising computer instructions for:
positioning an electric vertical take-off and landing (eVTOL) vehicle to be in a charging position on a ground, wherein:
the eVTOL vehicle is capable of performing vertical take-offs and landings;
the computer instructions for positioning the eVTOL vehicle to be in the charging position on the ground include computer instructions for extending an anchor into the ground; and
the eVTOL vehicle further includes a vertical spar, wherein the anchor retracts into the vertical spar; and
charging a battery while in the charging position on the ground using a wind turbine that includes a rotor.

18. The computer program product recited in claim 17, wherein the computer instructions for positioning the eVTOL vehicle to be in the charging position on the ground include computer instructions for rotating the rotor about a hinge.

19. The computer program product recited in claim 17, wherein the computer instructions for positioning the eVTOL vehicle to be in the charging position on the ground include computer instructions for rotating the rotor about a hinge and unlocking the hinge prior to rotating the rotor about the hinge.

20. The computer program product recited in claim 17, wherein:
   the eVTOL vehicle is positioned to be in the charging position on the ground in a secured area; and
   the computer program product further includes computer instructions for communicating with a secured area controller to receive an assigned location in the secured area for the eVTOL vehicle to be positioned in the charging position on the ground.

21. A computer program product, the computer program product being embodied in a non-transitory computer readable storage medium and comprising computer instructions for:
   positioning an electric vertical take-off and landing (eVTOL) vehicle to be in a charging position on a ground, wherein:
      the eVTOL vehicle is capable of performing vertical take-offs and landings; and
      the computer instructions for positioning the eVTOL vehicle to be in the charging position on the ground include computer instructions for causing a strut to hinge away from a vertical spar, wherein an end of the vertical spar and an end of the strut are in contact with the ground when the eVTOL vehicle is in the charging position on the ground; and
   charging a battery while in the charging position on the ground using a wind turbine that includes a rotor.

\* \* \* \* \*